(12) United States Patent
Rathbun et al.

(10) Patent No.: US 7,584,889 B2
(45) Date of Patent: *Sep. 8, 2009

(54) METHOD FOR A USER TO ANSWER QUESTIONS OR QUERIES USING ELECTRICAL CONTACTS

(75) Inventors: Darryl T. Rathbun, Stratford, CT (US); Thomas J. Foth, Trumbull, CT (US); Andrei Obrea, Seymour, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/712,080

(22) Filed: Feb. 28, 2007

(65) Prior Publication Data
US 2007/0152050 A1 Jul. 5, 2007

Related U.S. Application Data

(63) Continuation of application No. 10/976,466, filed on Oct. 28, 2004, now Pat. No. 7,216,808.

(51) Int. Cl.
*G06K 17/00* (2006.01)

(52) U.S. Cl. ............ 235/386; 235/375
(58) Field of Classification Search ........ 235/375, 235/486, 487, 492
See application file for complete search history.

(56) References Cited

U.S. PATENT DOCUMENTS

| | | | | |
|---|---|---|---|---|
| 3,461,276 A | * | 8/1969 | Recca | 235/492 |
| 3,678,251 A | * | 7/1972 | Delpino | 235/441 |
| 4,087,679 A | * | 5/1978 | Samreus nee Maymarev | 235/441 |
| 7,216,808 B2 | * | 5/2007 | Rathbun et al. | 235/386 |

* cited by examiner

*Primary Examiner*—Daniel St. Cyr
(74) *Attorney, Agent, or Firm*—Ronald Reichman; Angelo N. Chaclas

(57) ABSTRACT

A method that allows one to mark information with a pencil or ball point pen on a material and have the marked information represent answers to questions or responses to queries that may be read while the material is contained in an envelope. The material may be any cellulose type product, i.e., paper, cardboard, chipboard, wood or plastic, fabric, animal hide, etc. The marked entered information may be corrected by erasing the written information with an eraser and writing new information on the paper with a pencil or ball point pen.

24 Claims, 7 Drawing Sheets

METHOD FOR A USER TO ANSWER QUESTIONS OR QUERIES USING ELECTRICAL CONTACTS

CROSS REFERENCE TO RELATED APPLICATIONS

This application is a Continuation of commonly owned, U.S. patent application Ser. No. 10/976,466, filed Oct. 28, 2004, now U.S. Pat. 7,216,806 entitled "METHOD FOR A USER TO ANSWER QUESTIONS OR QUERIES USING ELECTRICAL CONTACTS" which is incorporated herein by reference in its entirety.

FIELD OF THE INVENTION

This invention pertains to electronic circuits and, more particularly, to connecting electronic circuits with a pencil or ball point pen to answer questions or queries.

BACKGROUND OF THE INVENTION

From the invention of paper thousands of years ago to the present date, paper has been used as the preferred medium by individuals and societies for the recording, processing and storing of information. With the introduction of computers into society, many of the functions previously performed exclusively with paper are now being accomplished by writing information on paper and entering the written information into a computer. Typically, the information written on paper is entered into computers by optically scanning the paper. Often the paper is contained in an envelope that has to be opened before the paper is scanned. Thus, the foregoing method of entering information into computers is inconvenient and time consuming.

Another method utilized by the prior art for entering information contained in an envelope into a computer without opening the envelope involved the use of radio frequency identification (RFID) tags. The RFID tags were programmed to contain digital information either during the manufacturing of the read-only memory portion of the RFID integrated circuit, or in the field using electromagnetic radio frequency signals to store information in the nonvolatile memory portion of the RFID tag. One of the difficulties involved in the utilization of RFID tags is that the RFID tags are relatively expensive.

A method utilized by the prior art for the scoring of multiple-choice and/or true or false tests, i.e., Scholastic Aptitude Tests, involves depositing graphite information by a pencil on specific portions of the card that is electrically read, based upon the conductivity of the deposited graphite. The prior art also uses card readers to electrically and optically read punched cards to enter information into systems. The prior art also optically read markings on a page. A disadvantage of the foregoing is that the tests could not be read if they were contained in envelopes.

SUMMARY OF THE INVENTION

This invention overcomes the disadvantages of the prior art by providing a method that allows one to mark information with a pencil or ball point pen on a material and have the marked information represent answers to questions or responses to queries that may be read while the material is contained in an envelope. The material may be any cellulose type product, i.e., paper, cardboard, chipboard, wood or plastic, fabric, animal hide, etc. The marked entered information may be corrected by erasing the written information with an eraser and writing new information on the paper with a pencil or ball point pen.

This invention accomplishes the foregoing by placing electrical contacts at or near one of the edges of a material; placing a conductor on the material; applying by the user drawn lines with a pencil or ball point pen on the material in a manner that the drawn lines will connect one or more contacts to the conductor so that the contacts will indicate answers to questions or queries that have been proposed to the user; and covering the material so that the drawn lines will not be exposed and at least a portion of the contacts will be exposed. The material may be covered by an envelope in a manner that the envelope exposes at least a portion of the contacts through an opening that is in the envelope so that the answers to the questions or queries may be read by a device.

In an alternate embodiment of the invention, the material is folded in a manner that at least a portion of the contacts will be exposed, and the conductor and drawn lines will be covered by the material. The edges of the material may be sealed to conceal the answers to questions or queries.

DETAILED DESCRIPTION OF THE PREFERRED EMBODIMENT

Figure 1:
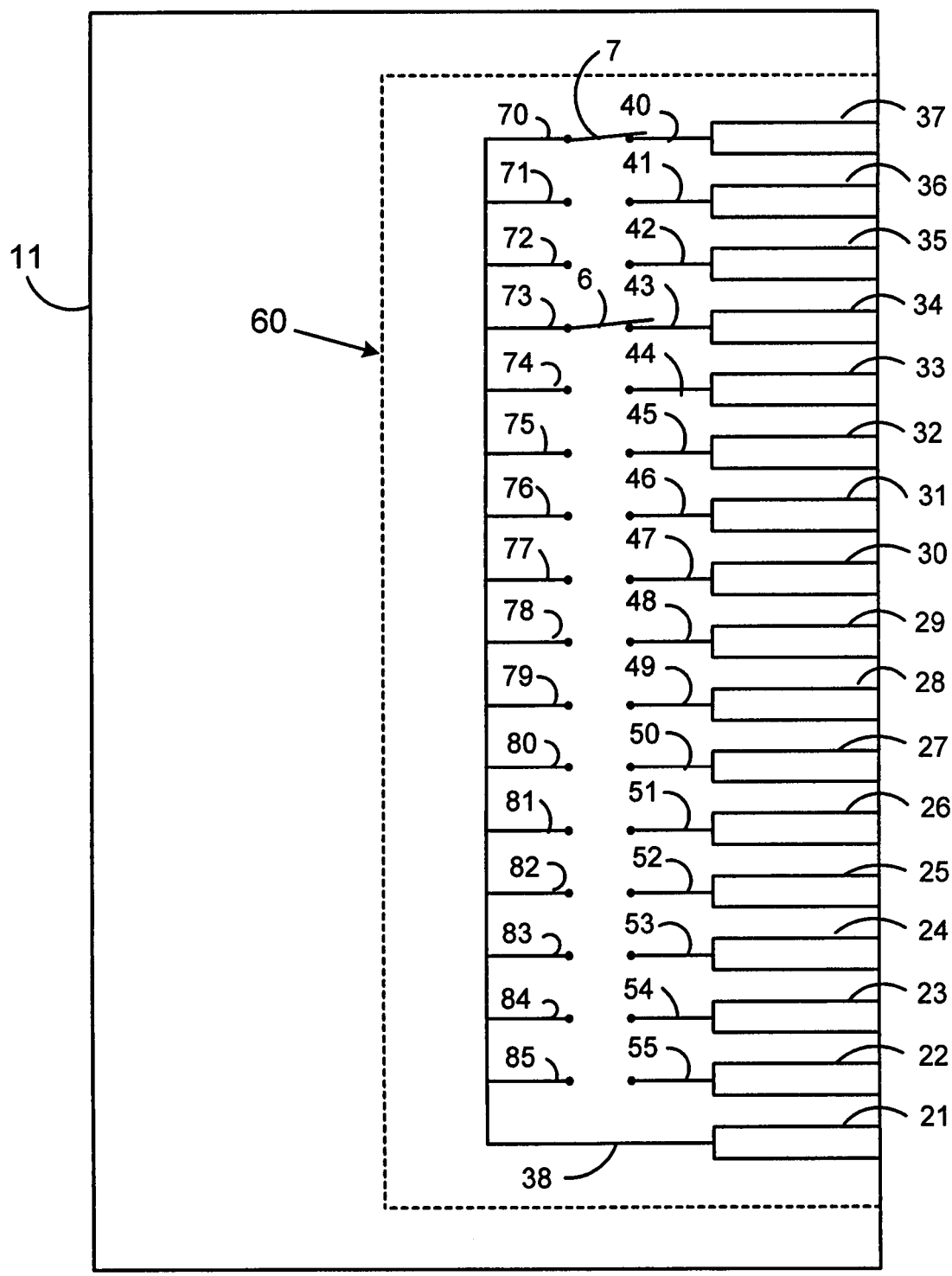
FIG. 1 is a drawing showing how a circuit may be drawn on a material to allow a user to answer questions.

Referring now to the drawings in detail, and more particularly to FIG. 1, the reference character 11 represents a material, i.e., cellulose type product, paper, cardboard, plastic, etc. A standard computer printer like the model Desk Jet 880C printer manufactured by Hewlett Packard using a Hewlett Packard 45 black ink cartridge prints graphite contacts 21-37, lines, 40-55, 70-85, and conductor 38 on material 11.

If the user decides to answer question number A in the affirmative, the user would use a graphite pencil, i.e., number 2, HB, etc., or a Paper Mate® black ballpoint pen to connect line 70 to line 40 with line 7. If the user decides to answer question number B in the negative, the user would use a graphite pencil, i.e., number 2, HB, etc., or a Paper Mate® black ballpoint pen to connect line 73 to line 43 with line 6. Graphite contacts 21-37, lines 40-55, and 70-85, conductor 38 and any lines drawn to contacts 22-37 from lines 70-85 will form circuit 60. The description of FIG. 7 will describe how contacts 21-37 may be electrically read at high speeds.

Figure 2:
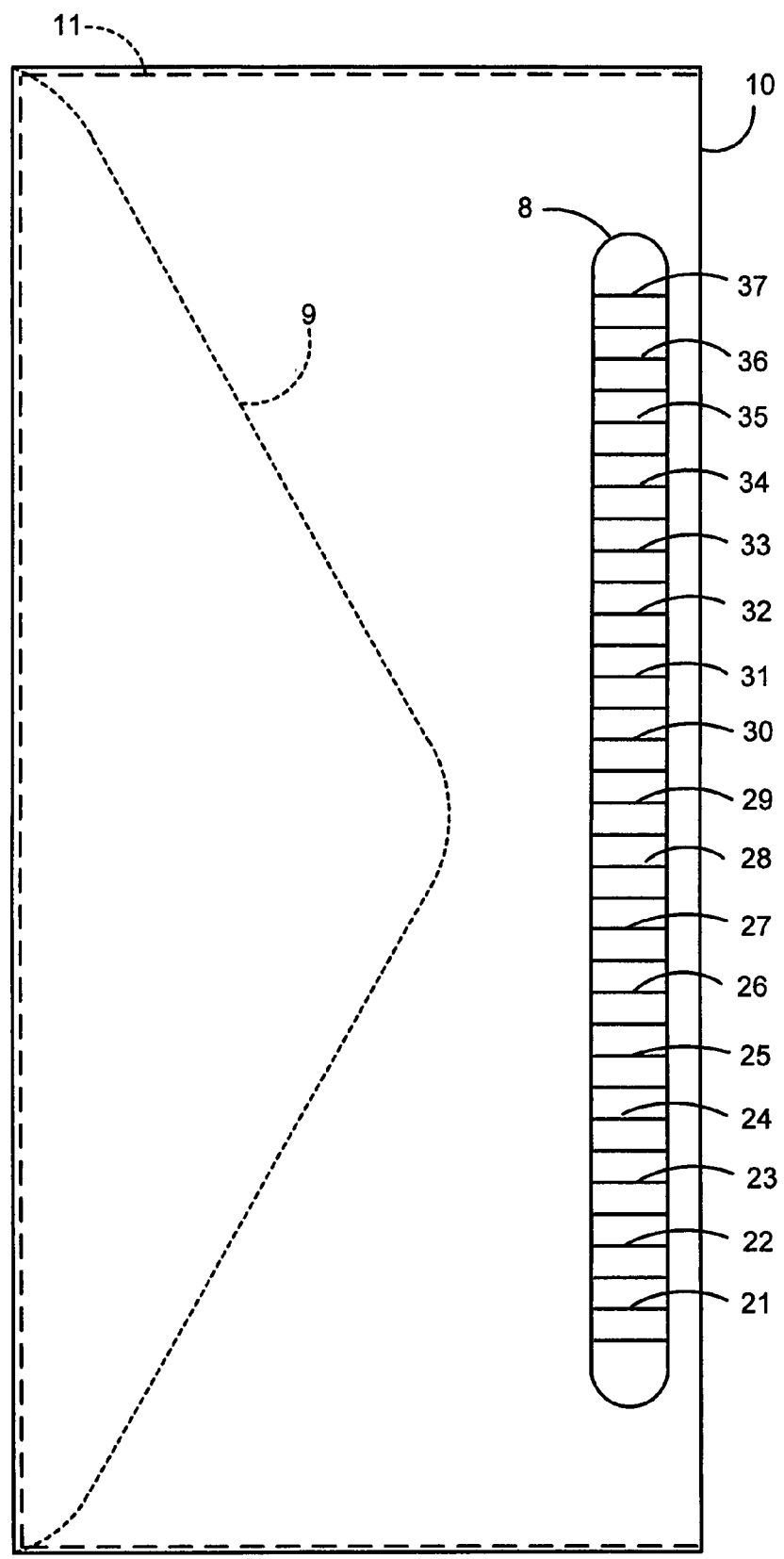
FIG. 2 is a drawing of the material described in FIG. 1 in an envelope.

FIG. 2 is a drawing of the material described in FIG. 1 in an envelope. Material 11 is placed in an envelope 10 having a flap 9 in a manner that a portion of contacts 21-37 will be accessible through slot 8. The description of FIG. 7 will describe how contacts 21-37 may be electrically read through slot 8 at high speeds.

Figure 3A:
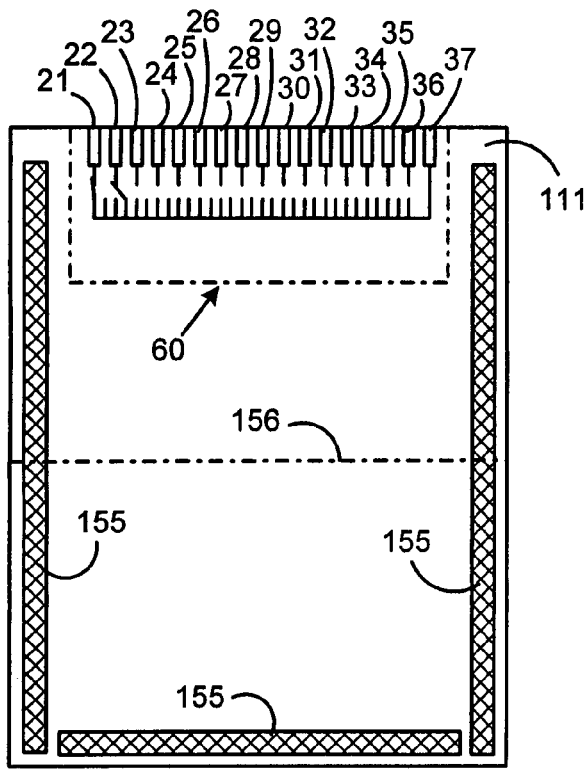
FIGS. 3A-3C is an alternate embodiment of this invention showing a material having a circuit that allows a user to answer questions being folded to form a mail piece.
Figure 3C:
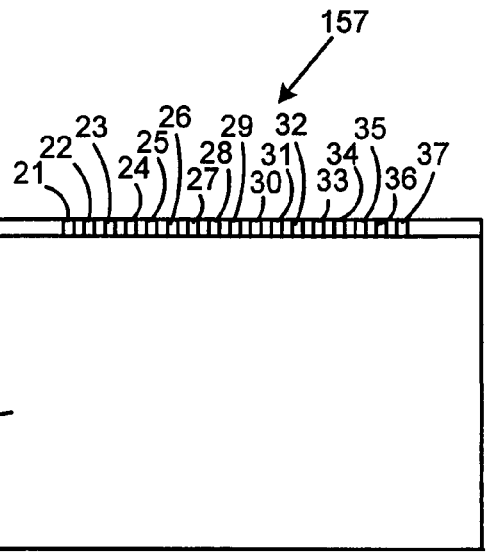
Figure 3B:
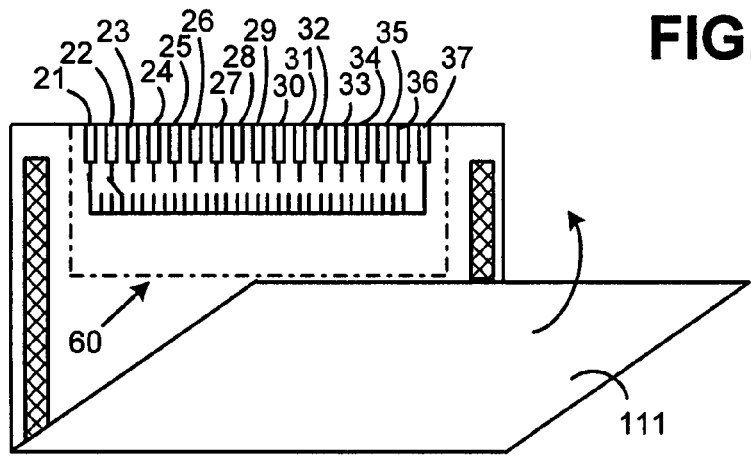

FIGS. 3A-3C is an alternate embodiment of this invention showing a material having a circuit that allows a user to answer questions by completing circuit 60 as described in FIG. 1 being folded to form a mail piece. Material 111 is a cellulose type product, stiff paper, cardboard, etc. that contains circuit 60. A standard computer printer like the model Desk Jet 880C printer manufactured by Hewlett Packard using a Hewlett Packard 45 black ink cartridge prints the components of circuit 60 which is described in the description of FIG. 1. Material 111 has an adhesive 155, i.e., glue strips, along three of its edges and a fold line 156.

FIG. 3B illustrates material 111 being folded along line 156.

FIG. 3C illustrates material 111 folded along line 156 to form a mail piece 157 with a portion of contacts 21-37 being covered with material 111. The back of mail piece 157 is shown. It will be obvious to one skilled in the art that the sender's and recipient's name and address as well as the proper postage will be placed on the front (not shown) of mail piece 157.

Figure 4:
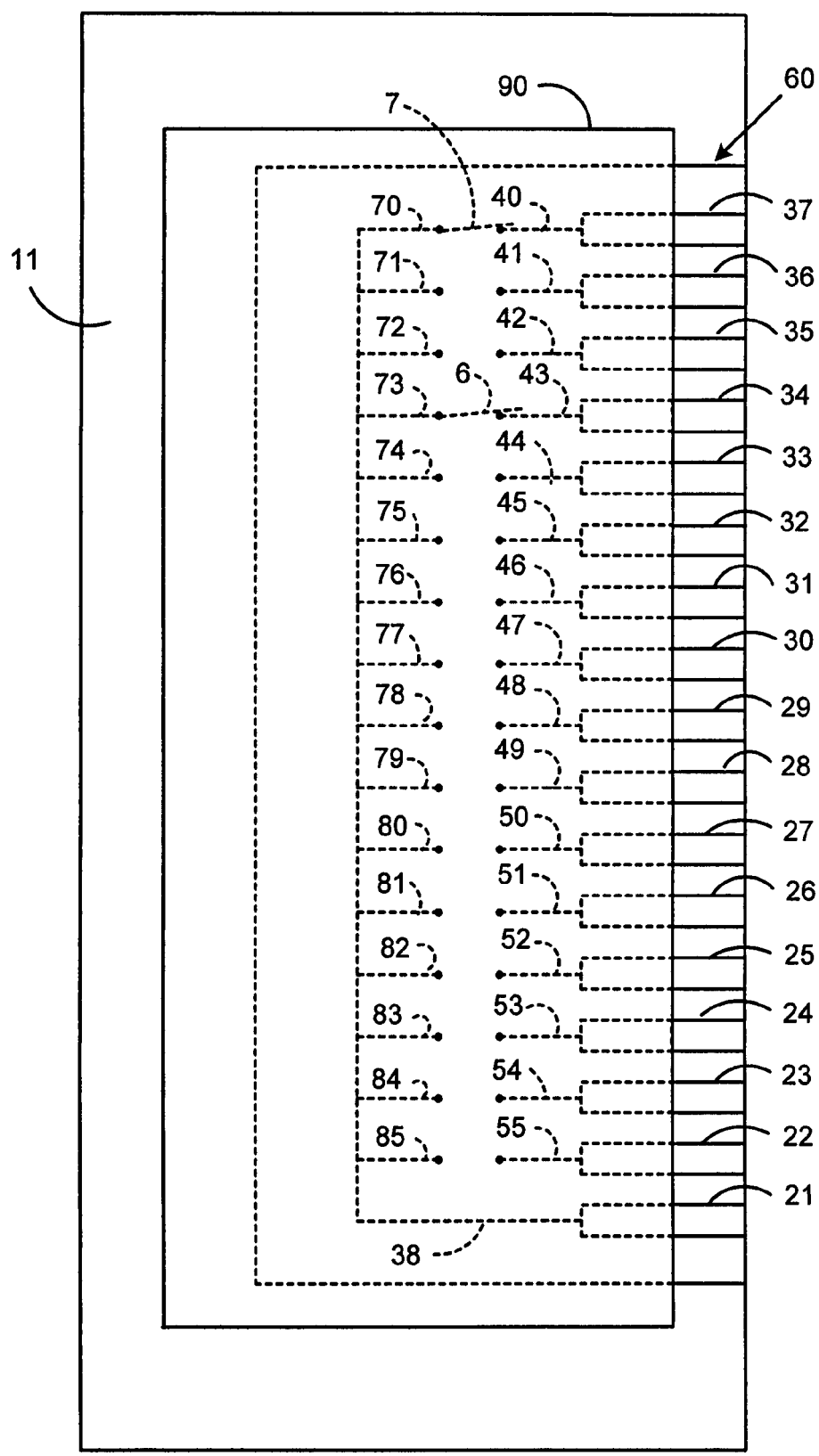
FIG. 4 is a drawing showing the circuit of FIG. 1 being covered with insulating material 70.

FIG. 4 is a drawing showing the circuit of FIG. 1 being covered with insulating material 90 with a portion of contacts 21-37 being exposed. Insulating material 90 may be a non conductive paint, plastic material, non-conductive tape, non-conductive label. The description of FIG. 7 will describe how contacts 21-37 may be electrically read at high speeds.

Figure 5:
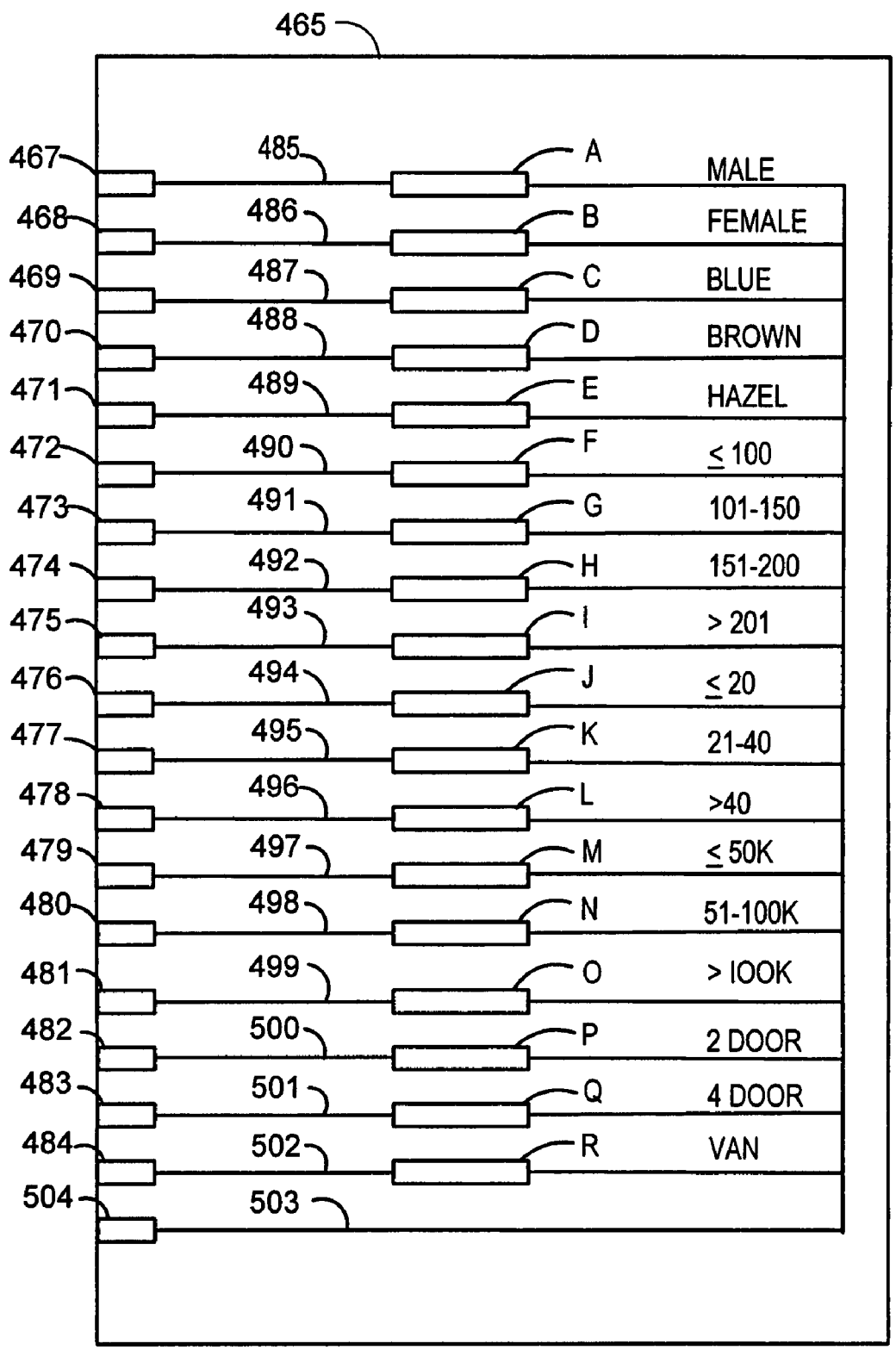
FIG. 5 is a drawing showing an alternate embodiment of FIG. 1 in which a user may answer various types of questions.

FIG. 5 is a drawing showing an alternate embodiment of FIG. 1, in which a user may answer various types of questions. Graphite contacts: 467-484 and 504, lines 485-503 are printed on material 465, i.e., cellulose type product, paper, cardboard, plastic, etc., by a standard computer printer like the model Desk Jet 880C printer manufactured by Hewlett Packard using a Hewlett Packard 45 black ink cartridge.

Rectangle "A" appears on line 485, which is connected to contact 467, and rectangle "B" appears on line 486 which is connected to contact 468. Rectangle "C" appears on line 487, which is connected to contact 469, and rectangle "D" appears on line 488, which is connected to contact 470. Rectangle "E" appears on line 489, which is connected to contact 471, and rectangle F is connected to line 490 which is connected to contact 472. Rectangle "G" appears on line 491, which is connected to contact 473, and rectangle "H" appears on line 492, which is connected to contact 474. Rectangle "I" appears on line 493, which is connected to contact 475, and rectangle "J" appears on line 494, which is connected to contact 476. Rectangle "K" appears on line 495, which is connected to contact 477, and rectangle "L" is connected to line 496 which is connected to contact 478. Rectangle "M" appears on line 497, which is connected to contact 479, and rectangle "N" appears on line 498, which is connected to contact 480. Rectangle "O" appears on line 499, which is connected to contact 481, and rectangle "P" appears on line 500, which is connected to contact 482. Rectangle "Q" appears on line 501, which is connected to contact 483 and rectangle R is connected to line 502 which is connected to contact 484. Line 503 is connected to contact 504. Rectangles A through R are printed by a standard computer printer like the DeskJet 880C printer manufactured by Hewlett Packard using a Hewlett Packard 78 tri-color cartridge and any combination of the cyan, magenta, and yellow inks.

If the user is a male, the user uses a graphite pencil, i.e., number 2, HB, etc., or a Paper Mate® black ball point pen to fill in rectangle "A". If the user has blue eyes and weighs 160 pounds, the user uses a graphite pencil, i.e., number 2, HB, etc., or a Paper Mate® black ball point pen to fill in rectangles "C" and "H". If the user is forty-two years old and earns over 100,000 a year, the user uses a graphite pencil, i.e., number 2, HB, etc., or a Paper Mate® black ball point pen to fill in rectangles "L" and "O". If the user is reporting a two-door sedan vehicle, the user uses a graphite pencil, i.e., number 2, HB, etc., or a Paper Mate® black ball point pen to fill in rectangle 'P'.

If the user changes his/her mind regarding the answer to one of the questions or makes a mistake in filling in one of the rectangles, the user could erase the penciled marking in the rectangle with a pencil.

Figure 6:
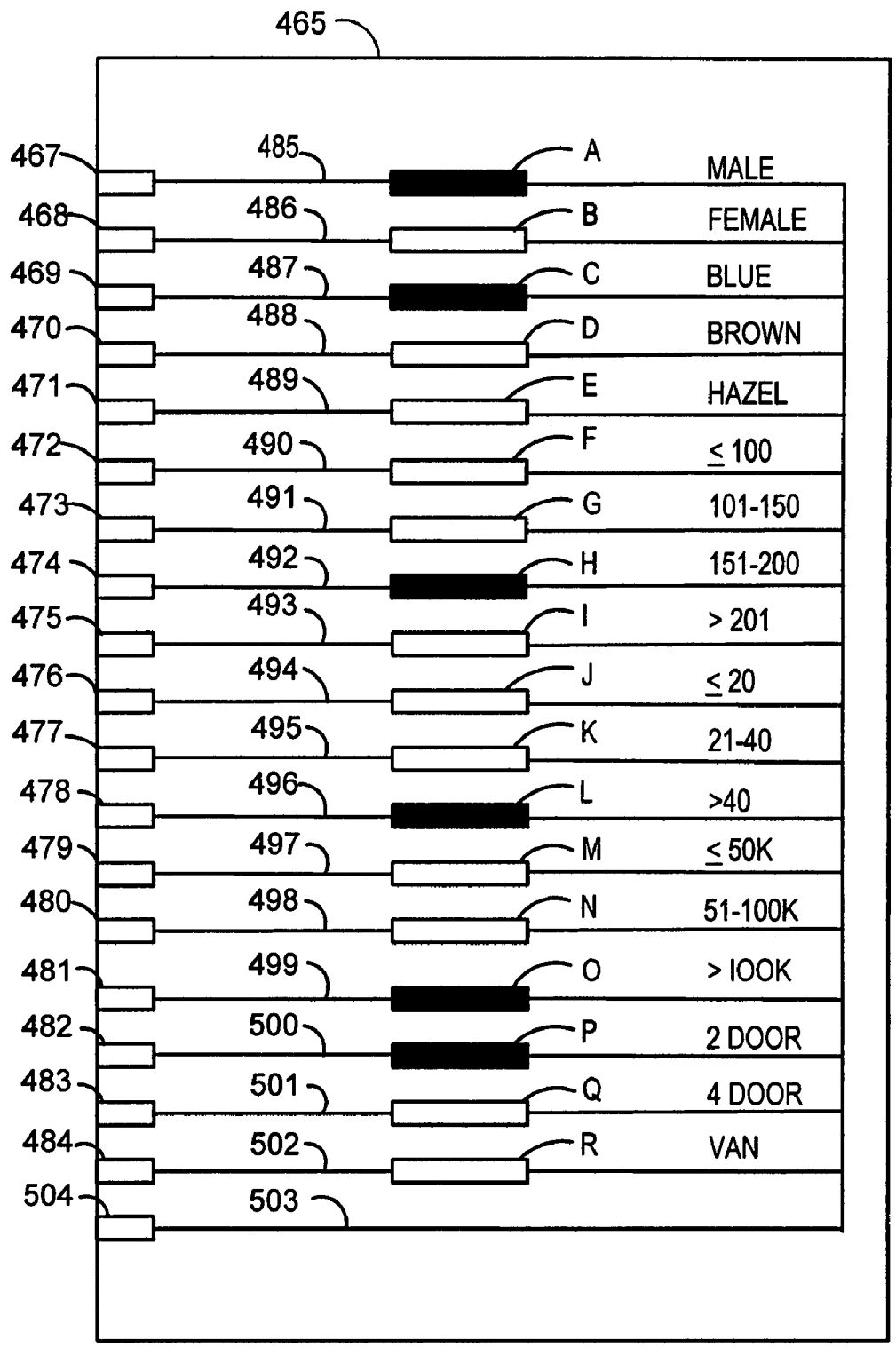
FIG. 6 is a drawing showing how the circuit of FIG. 5 stores information in the circuit and how the circuit forms a bar code.

FIG. 6 is a drawing showing how the circuit of FIG. 5 stores information in the circuit and how the circuit forms a bar code. If someone decides to use a graphite pencil, i.e., number 2, HB, etc., or a Paper Mate® black ballpoint pen to fill in rectangles A, C, H, L, O and P, a barcode will be formed. Rectangle A would represent a binary one of a bar code, and a closed circuit will exist between contact 467, line 485, line 503, and contact 504. Rectangle C would represent a binary one of a bar code, and a closed circuit will exist between contact 469, line 487, line 503, and contact 504. Rectangle H would represent a binary one of a bar code, and a closed circuit will exist between contact 474, line 492, line 503, and contact 504. Rectangle L would represent a binary one of a bar code, and a closed circuit will exist between contact 478, line 496, line 503, and contact 504. Rectangle O would represent a binary one of a bar code, and a closed circuit will exist between contact 481, line 499, line 503, and contact 504. Rectangle P would represent a binary one of a bar code, and a closed circuit will exist between contact 482, line 500, line 503, and contact 504.

It would be obvious to one skilled in the art if rectangles B, D, E, F, G, I, J, K, M, N, Q and R and were filled in with a graphite pencil, rectangles B, D, E, F, G, I, J, K, M, N, Q and R would represent binary ones; and, if rectangles A, C, H, L, O and P were not filled in with a graphite pencil, rectangles A, C, H, L, O and P would represent binary zeros. The lines and contacts connecting rectangles B, D, E, F, G, I, J, K, M, N, Q and R would be closed circuits, and the contacts connecting rectangles A, C, H, L, O and P would be open circuits. Thus, a standard bar code imager, such as Symbol Technologies model P3001MG, can scan the filled and empty rectangles and interpret them as a bar code. Therefore, the answers to queries posed to the person who completes the form can be read optically.

Figure 7:
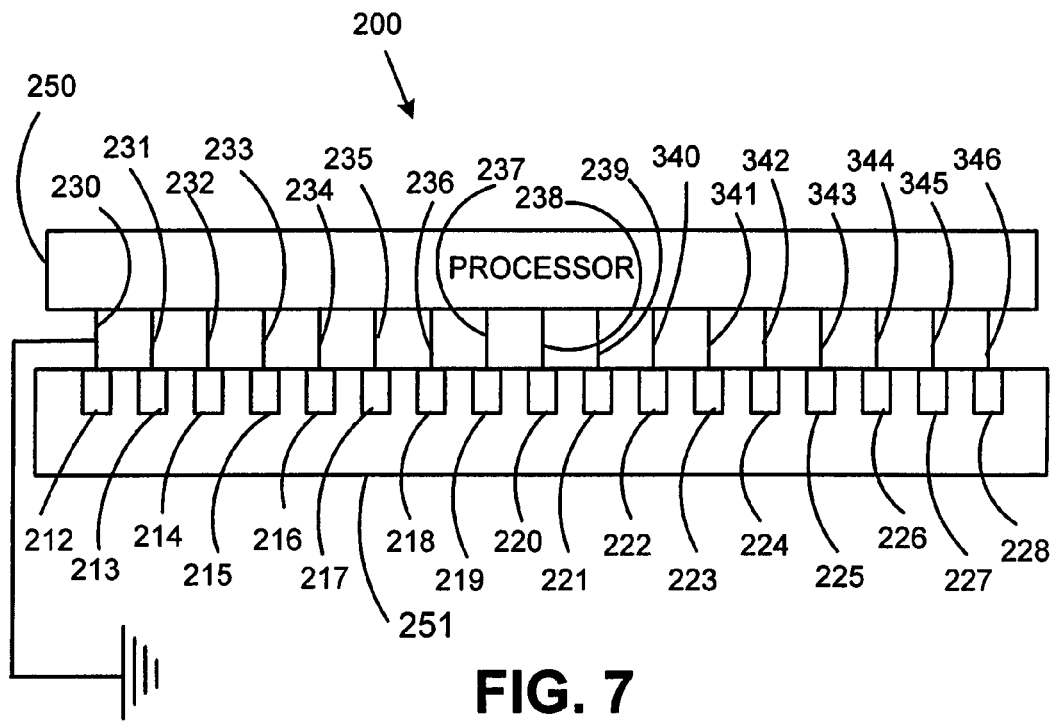
FIG. 7 is a drawing of a front view of a graphic contact reading device.

FIG. 7 is a drawing of a front view of a graphite contact reading device 200. Copper spring contacts or fine comb wires 212-228 are spaced in housing 251 of device 200 in a manner that, when material 11 (FIGS. 1 and 4), and/or envelope 10 (FIG. 2) and/or material 111 (FIG. 3C) are inserted into device 200, contacts 21-37 (FIGS. 1, 2 and 4), respectively, will be engaged with copper spring contacts 212-228 and/or contacts 37-21 (FIG. 3C) respectively, will be engaged with copper spring contacts 212-228. Copper spring contact 212 is connected to ground and to processor 250 by wire 230, and copper spring contacts 212-228 are respectively connected to the binary inputs of processor 250 via wires 230-239, 340-346. It would be obvious to one skilled in the art that processor 250 may be a micro-processor, micro-controller or a general purpose computer. It would be obvious to one skilled in the art that a device similar to device 200 that has additional contacts will be used for reading information entered on material 465 (FIGS. 5 and 6). Thus, the answers to the queries posed to the person who completes the form can be read electrically by processor 250.

The binary inputs of processor 250 are pulled "logic high" to positive +5 volts by internal pull up resistors (not shown) which are contained in processor 250. When a person completes part of circuit 60 by using a graphite pencil number 2, HB, etc. or Paper Mate black ball point pen, the corresponding processor 250 binary input is at logic low (0 volts). When the person does not complete part of circuit 60 with a graphite pencil number 2, HB, etc. or Paper Mate black ball point pen, the processor's 250 corresponding binary input is at logic high (+5 volts).

Figure 8:
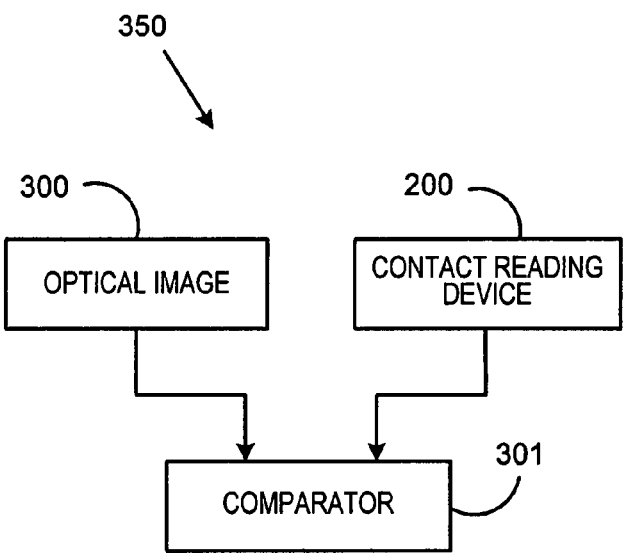
FIG. 8 is a drawing of a device that is used to determine if the bar code entered by a user in FIG. 6 represents the same answers to the questions or queries indicated by the electrical indications on the graphite contacts.

FIG. 8 is a drawing of a device 350 that is used to determine if the bar code entered by a user in FIG. 6 represents the same answers to the questions or queries indicated by the electrical indications on the graphite contacts of FIG. 6. Graphite contact reading device 200 (FIG. 8) will read the electrical signals on contacts 467-484 and 504 (FIG. 6) and transmit the readings to comparator 301. Optical imager 300, which may be Symbol Technologies P3001MG, will scan and read the bar code formed on material 465 of FIG. 6 and transmit the readings to comparator 301. Comparator 301 will compare the information obtained from device 200 with scanner 300 and indicate or verify the different readings if any.

The above specification describes a new and improved circuit that utilizes printed lines to perform the function of wires so that connections may be switched in the circuit by having an individual connect different printed wires by drawing a penciled or inked lines between the printed lines. It is realized that the above description may indicate to those skilled in the art additional ways in which the principles of this invention may be used without departing from the spirit. Therefore, it is intended that this invention be limited only by the scope of the appended claims.

What is claimed is:

1. A method for a user to answer questions or queries, which comprises the steps of:
    A) receiving a material having electrical contacts and a conductor therein, wherein the material is covered with an envelope that exposes at least a portion of the contacts through an opening that is in the envelope, and
    B) applying drawn lines with a pencil or ball point pen on the material in a manner that the drawn lines will connect one or more contacts to the conductor so that the contacts will indicate answers to questions that have been proposed.

2. The method claimed in claim 1, further including the step of covering the material so that the drawn lines will not be exposed and at least a portion of the contacts will be exposed.

3. The method claimed in claim 1, wherein the contacts are at or near the edges of the material.

4. The method claimed in claim 1, further including the step of: covering the conductor so that the conductor will not be exposed.

5. The method claimed in claim 1, wherein the material is covered with an insulator.

6. The method claimed in claim 1, wherein the material is covered with a non-conducting paint.

7. The method claimed in claim 1, further including the step of: folding the material so that the drawn lines, will be covered, by the material and at least a portion of the contacts will be exposed through the opening in the envelope.

8. The method claimed in claim 1, further including the step of:
    having the contacts read to determine the answers to the questions or queries.

9. The method claimed in claim 1, further including the step of:
    inserting the material into a device in a manner that the answers to questions or queries may be read by the device.

10. The method claimed in claim 9, wherein the device is a verification device.

11. The method claimed in claim 1, wherein the pencil is a graphite pencil.

12. The method claimed in claim 1, further including the step of:
    erasing one or more of the drawn lines to change the answers to the questions or queries.

13. The method claimed in claim 12, further including the step of:
    erasing the drawn lines with an eraser.

14. The method claimed in claim 1, wherein the material is paper.

15. The method claimed in claim 1, wherein the material is cardboard.

16. The method claimed in claim 1, wherein the material is a cellulose product.

17. The method claimed in claim 1, wherein the material is tape, labels.

18. The method claimed in claim 1, wherein the electrical contacts are placed on the material with an ink jet printer.

19. The method claimed in claim 1, wherein the conductor is placed on the material with an ink jet printer.

20. The method claimed in claim 1, wherein the drawn lines form one or more bars of a bar code.

21. The method claimed in claim 20, further including the steps of:
    having the contacts read to determine the answers to the questions or queries;
    reading the bar code to determine the answers to the questions or queries; and
    comparing the read contacts with the read bar code to indicate different readings.

22. A product comprising:
    a base material;
    a plurality of contacts on the base material; and
    a plurality of conductor sections on the base material, at least one of the conductor sections connected to at least one contact, wherein the conductions are adapted to receive a line made with a pencil or ball point pen to complete a circuit that is indication of answers to questions and the material is covered with an envelope that exposes at least a portion of the contacts through an opening that is in the envelope.

23. The product claimed in claim 22, wherein the contacts are at or near the edges of the material.

24. The product claimed in claim 22, where the material is covered with an envelope that exposes at least a portion of the contacts through an opening that is in the envelope.

* * * * *